(12) United States Patent
Wang et al.

(10) Patent No.: US 9,860,175 B2
(45) Date of Patent: Jan. 2, 2018

(54) METHODS, SYSTEMS, AND COMPUTER PROGRAM PRODUCTS FOR PROCESSING A PACKET

(75) Inventors: Ren Wang, Portland, OR (US); Sanjay Rungta, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 34 days.

(21) Appl. No.: 13/994,416

(22) PCT Filed: Dec. 22, 2011

(86) PCT No.: PCT/US2011/066812
§ 371 (c)(1),
(2), (4) Date: Jun. 16, 2014

(87) PCT Pub. No.: WO2013/095502
PCT Pub. Date: Jun. 27, 2013

(65) Prior Publication Data
US 2014/0301199 A1    Oct. 9, 2014

(51) Int. Cl.
*H04L 12/803* (2013.01)
*H04L 29/06* (2006.01)
*H04L 29/08* (2006.01)

(52) U.S. Cl.
CPC ........ *H04L 47/125* (2013.01); *H04L 67/1023* (2013.01); *H04L 69/18* (2013.01)

(58) Field of Classification Search
None
See application file for complete search history.

(56) References Cited

U.S. PATENT DOCUMENTS 7,284,119 B2    10/2007    Hyder et al.
7,782,782 B1    8/2010     Ferguson et al.
(Continued)

FOREIGN PATENT DOCUMENTS

CN    101689158 A     3/2010
WO    2013095502 A1    6/2013

OTHER PUBLICATIONS

International Search Report and Written Opinion received for PCT Patent Application No. PCT/US2011/066812, dated Sep. 25, 2012, 10 pages.

(Continued)

*Primary Examiner* — Christopher Crutchfield
*Assistant Examiner* — Alan Lindenbaum
(74) *Attorney, Agent, or Firm* — Barnes & Thornburg LLP

(57) ABSTRACT

A system for processing a packet may include, for each of a network interface controller and a central processing unit, a measurement of the processing time, a determination of the amount of energy consumed to process a unit of information in the packet, and a measurement of the load. A user may provide the system with signals to perform networking processes for the packet in a manner to reduce the processing time of the system or in a manner to reduce the amount of energy consumed by the system for processing the packet. A portion of the system may receive at least one of the measurements, determinations, and signals and may cause one of the network interface controller and the central processing unit to perform networking processes for the packet. The networking processes may include establishing a connection to a network.

18 Claims, 11 Drawing Sheets

(56) References Cited

U.S. PATENT DOCUMENTS

| | | |
|---|---|---|
| 7,920,470 B2 | 4/2011 | Lindsay |
| 8,799,547 B2 | 8/2014 | Mahadevan et al. |
| 2007/0025395 A1 | 2/2007 | Cardona et al. |
| 2007/0162572 A1* | 7/2007 | Aloni .................... G06F 9/5077 709/219 |
| 2008/0120426 A1 | 5/2008 | Balakrishnan et al. |
| 2008/0298274 A1* | 12/2008 | Takashige ........... H04L 12/4641 370/254 |
| 2009/0135751 A1* | 5/2009 | Hodges ................ G06F 1/3209 370/311 |
| 2010/0241831 A1* | 9/2010 | Mahadevan ............ G06F 9/505 712/42 |
| 2010/0299392 A1* | 11/2010 | Chiou ................. H04L 12/5805 709/206 |
| 2011/0116390 A1* | 5/2011 | Ramachandran ..... H04L 43/026 370/252 |

OTHER PUBLICATIONS

International Preliminary Report on Patentability and Written Opinion received for PCT Patent Application No. PCT/US2011/066812, dated Jul. 3, 2014, 7 pages.
Office Action and Search Report received for Taiwan Patent Application No. 101148755, dated Sep. 23, 2014, 18 pages of Office Action and Search Report including 8 pages of English Translation.

\* cited by examiner

METHODS, SYSTEMS, AND COMPUTER PROGRAM PRODUCTS FOR PROCESSING A PACKET

BACKGROUND

As improvements in networking technologies have facilitated greater transmission speeds, computers increasingly are being used to process information retrieved from networks rather than merely to process information via application programs. This has resulted in a growing amount of the operating capability of central processing units being used for networking processes for packets of information to the detriment of this operating capability being available for other operations. In addition to performing operations on headers and footers and extracting encapsulated data, such networking processes may also include establishing a connection to a network so that the sought information may be retrieved.

To alleviate this situation, offload engines have been developed to shift networking processes from central processing units to network interface controllers. In addition to freeing central processing units for other operations, offloading also reduces traffic through local input/output interconnects such as, for example, those operating under Peripheral Component Interconnect Express standards. Offload engines intended to operate according to the Internet protocol suite are known as Transmission Control Protocol (TCP) offload engines.

TCP offload engines generally may be classified into two categories. Partial TCP offload engines shift the data path from central processing units to network interface controllers and relieve central processing units from processing data transmissions and receptions. However, central processing units still perform the operations to establish connections to networks. Offloading from central processing units to network interface controllers occurs after network connections have been established. TCP Chimney Offload technology, developed by Microsoft Corporation, is an example of a partial TCP offload engine. In contrast, with full TCP offload engines, performance of both packet processing and the establishment of network connections is shifted to network interface controllers.

Regardless of whether a TCP offload engine is partial or full, the only criterion considered in current implementations is the load of the network interface controller. In operation, a current TCP offload engine automatically shifts networking processes from a central processing unit to a network interface controller so long as the load of the network interface controller is less than a full load.

BRIEF DESCRIPTION OF THE DRAWINGS/FIGURES

FIGS. 1, 3, and 5 are process flowcharts of example methods for processing a packet, according to embodiments.

FIGS. 2, 4, and 6 are block diagrams of examples of software or firmware embodiments of, respectively, methods 100, 300, and 500, according to embodiments.

FIGS. 7, 8, and 9 are block diagrams of example systems for processing a packet, according to embodiments.

Figure 1:
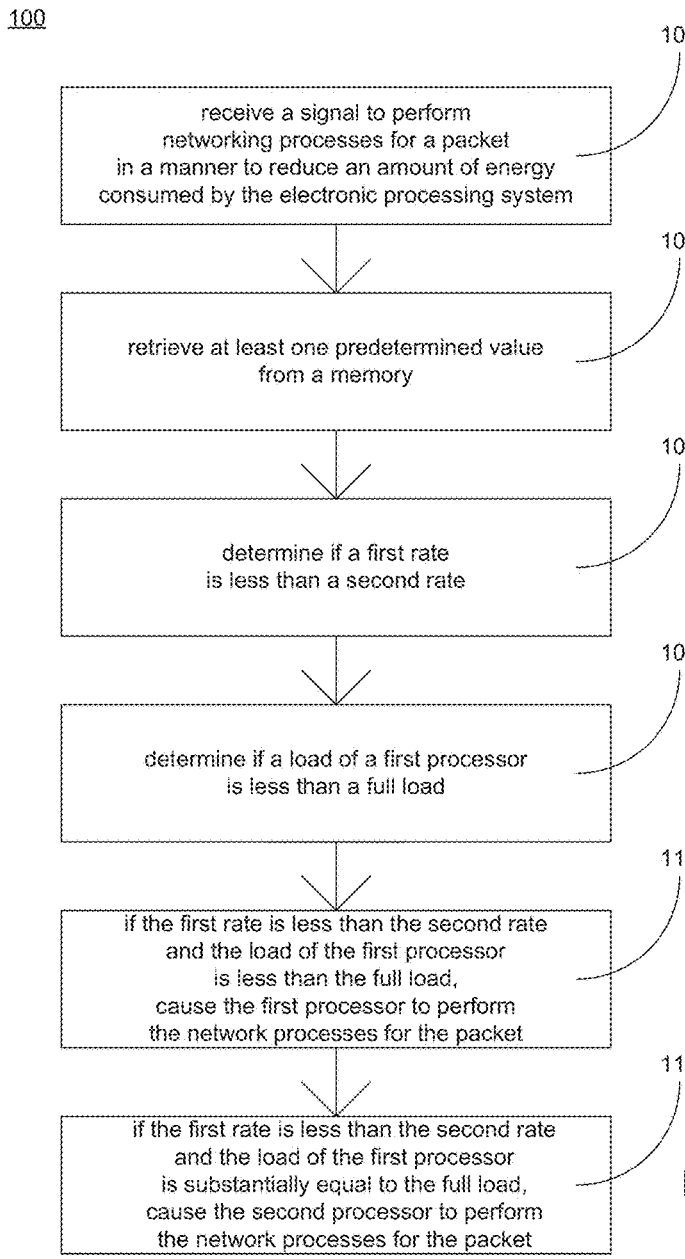

In the drawings, the leftmost digit(s) of a reference number identifies the drawing in which the reference number first appears.

DETAILED DESCRIPTION

Embodiments are now described with reference to the figures, where like reference numbers indicate identical or functionally similar elements. While specific configurations and arrangements are discussed, it should be understood that this is done for illustrative purposes only. A person skilled in the relevant art will recognize that other configurations and arrangements may be used without departing from the spirit and scope of the description. It will be apparent to a person skilled in the relevant art that this may also be employed in a variety of other systems and applications other than what is described herein.

Disclosed herein are methods, systems, and computer program products for processing a packet. A system for processing a packet may include, for each of a network interface controller and a central processing unit, a measurement of the processing time, a determination of the amount of energy consumed to process a unit of information in the packet, and a measurement of the load. A user may provide the system with signals to perform networking processes in preferred manners. A portion of the system may receive at least one of the measurements, determinations, and signals and may cause one of the network interface controller and the central processing unit to perform networking processes for the packet. The networking processes may include establishing a connection to a network. Although embodiments described herein are explained in terms of processing a single packet, a person skilled in the relevant art will understand these embodiments may also operate on a flow of packets, such as a sequence of packets that are intended to be processed as a collection. Accordingly, the embodiments described herein apply to a flow of packets in the same manner that they apply to a single packet.

A user may provide the system with a signal to perform the networking processes for the packet in a manner to reduce the processing time of the overall system. For example, performance of the networking processes may be distributed between the network interface controller and the central processing unit.

Alternatively, a user may provide the system with a signal to perform the networking processes in a manner to reduce the amount of energy consumed by the overall system for processing the packet. For example, given a choice between the network interface controller and the central processing unit, the more energy efficient of the two may be selected to perform the networking processes until a load of the selected processor is substantially equal to a full load.

Alternatively, a user may provide the system with a signal to perform the networking processes in a manner to reduce the amount of energy consumed by the overall system for processing the packet until a desired maximum processing time is reached. For example, the more energy efficient of the network interface controller and the central processing unit may originally be selected to perform the networking processes. When a new connection starts, if the processing time is less than the desired maximum processing time, then the selected processor may perform the networking processes for the new connection.

Furthermore, the system may be used dynamically to shift the networking processes between the network interface controller and the central processing unit during ongoing connections. For example, if the networking processes for some packets have been completed by the network interface controller and a load of the network interface controller is less than a full load, ongoing networking processes for other packets being performed by the central processing unit may be shifted to the network interface controller. This may be done to optimize performance of the overall system, energy efficiency of the overall system, or other preferences.

Embodiments described herein recognize a deficiency in current implementations of TCP offload engines due to their lack of consideration of the performance of the overall system. Additionally, current implementations of TCP offload engines do not consider the energy efficiency of the overall system. Current TCP offload engines are not designed to shift networking processes between network interface controllers and central processing units to balance connections between the processors in order to optimize the performance of the overall system or the energy efficiency of the overall system. Moreover, current TCP offload engines do not provide a mechanism for a user of the overall system to express a preference for networking processes to be performed in a manner to reduce the processing time of the system or to be performed in a manner to reduce the amount of energy consumed by the system for processing the packet.

These deficiencies give rise to undesired effects. For example, a heavily loaded network interface controller may take a long time to process a packet, which in turn may degrade the performance of the overall system. Additionally, lack of consideration of the differences in energy efficiency of the network interface controller and the central processing unit may result in networking processes being performed by an inefficient network interface controller rather than by an efficient central processing unit, which in turn may tax the cooling system of the overall system and may limit the number of operations that may be performed by the overall system for a given cycle of its battery.

FIG. 1 is a process flowchart of an example method for processing a packet, according to an embodiment. A method 100 in FIG. 1 may be performed using an electronic processing system that operates hardware, software, firmware, or some combination of these.

In method 100, optionally, at 102, the electronic processing system may receive, from a user, a signal to perform networking processes for a packet in a manner to reduce an amount of energy consumed by the electronic processing system.

Optionally, at 104, the electronic processing system may retrieve at least one predetermined value from a memory. The at least one predetermined value may be of a first rate, a second rate, or both. The first rate may be the amount of energy consumed by a first processor to process a unit of information in the packet. The second rate may be the amount of energy consumed by a second processor to process the unit of information in the packet. The first and second rates may be expressed, for example, in joules per byte. The first processor may be a network interface controller or a central processing unit. The second processor may be the network interface controller or the central processing unit. The second processor is different from the first processor.

At 106, the electronic processing system may determine if the first rate is less than the second rate.

At 108, the electronic processing system may determine if a load of the first processor is less than a full load.

At 110, if the first rate is less than the second rate and the load of the first processor is less than the full load, then the electronic processing system may cause the first processor to perform the networking processes for the packet. Optionally, the networking processes may include establishing a connection to a network.

Optionally, at 112, if the first rate is less than the second rate and the load of the first processor is substantially equal to the full load, then the electronic processing system may cause the second processor to perform the networking processes for the packet. Optionally, the networking processes may include establishing the connection to the network.

Figure 2:
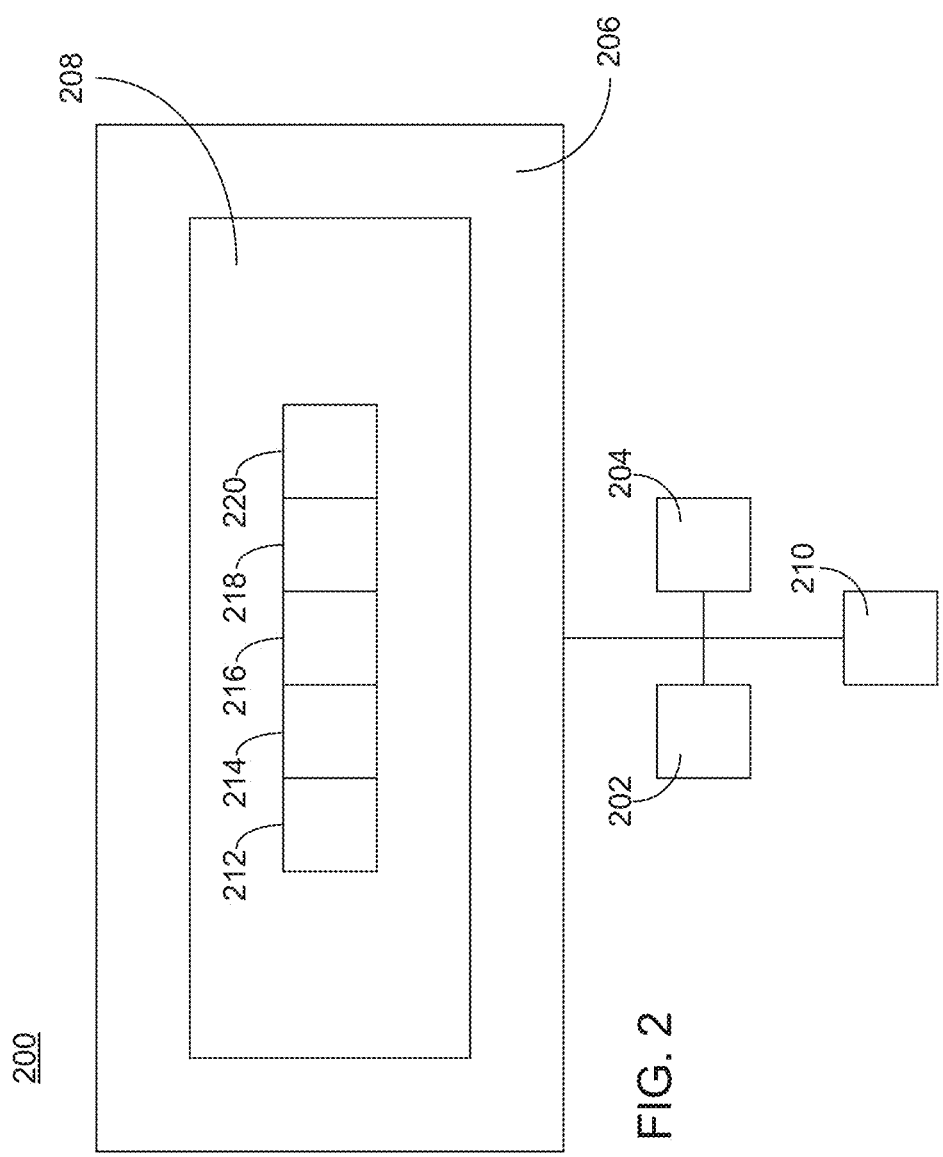

FIG. 2 is a block diagram of an example of a software or firmware embodiment of method 100, according to an embodiment. In FIG. 2, an electronic processing system 202 may include, for example, two or more programmable processors 202 and 204, a memory 206, a computer program logic 208, one or more I/O ports and/or I/O devices 210, first comparison logic 212, second comparison logic 214, and switching logic 216. Optionally, electronic processing system 200 may also include signal processing logic 218. Optionally, electronic processing system 200 may also include memory retrieval logic 220.

Two or more programmable processors 202 and 204 may be configured to execute the functionality of method 100 as described above. Two or more programmable processors 202 and 204 may include a network interface controller (NIC) and a central processing unit (CPU) and/or a graphics processing unit (GPU). Memory 206 may include one or more computer readable media that may store computer program logic 208. Memory 206 may be implemented as a hard disk drive, a removable media such as a compact disk, a read-only memory (ROM) or random access memory (RAM) device, for example, or some combination thereof. Two or more programmable processors 202 and 204 and memory 206 may be in communication using any of several technologies known to one of ordinary skill in the art, such as a bus. Computer program logic 208 contained in memory 206 may be read and executed by two or more programmable processors 202 and 204. The one or more I/O ports and/or I/O devices 210 may also be connected to two or more programmable processors 202 and 204 and memory 206.

In the embodiment of FIG. 2, computer program logic 208 may include first comparison logic 212, which may be configured to determine if a first rate is less than a second rate. The first rate may be an amount of energy consumed by a first processor to process a unit of information in a packet. The second rate may be the amount of energy consumed by a second processor to process the unit of information in the packet. The first and second rates may be expressed, for example, in joules per byte. The first processor may be a network interface controller or a central processing unit. The second processor may be the network interface controller or the central processing unit. The second processor is different from the first processor.

Computer program logic 208 may also include second comparison logic 214, which may be configured to determine if a load of the first processor is less than a full load or substantially equal to the full load.

Computer program logic 208 may also include switching logic 216, which may be configured to cause the first processor to perform networking processes for the packet if the first rate is less than the second rate and the load of the first processor is less than the full load. Optionally, the networking processes may include establishing a connection to a network. Optionally, switching logic 216 may also be configured to cause the second processor to perform the networking processes for the packet if the first rate is less than the second rate and the load of the first processor is substantially equal to the full load. Optionally, the networking processes may include establishing the connection to the network.

Optionally, computer program logic 208 may also include signal processing logic 218, which may be configured to receive, from a user, a signal to perform the networking processes for the packet in a manner to reduce the amount of energy consumed by electronic processing system 200.

Optionally, computer program logic 208 may also include memory retrieval logic 220, which may be configured to retrieve at least one predetermined value from a memory. The at least one predetermined value may be of the first rate, the second rate, or both.

Figure 3:
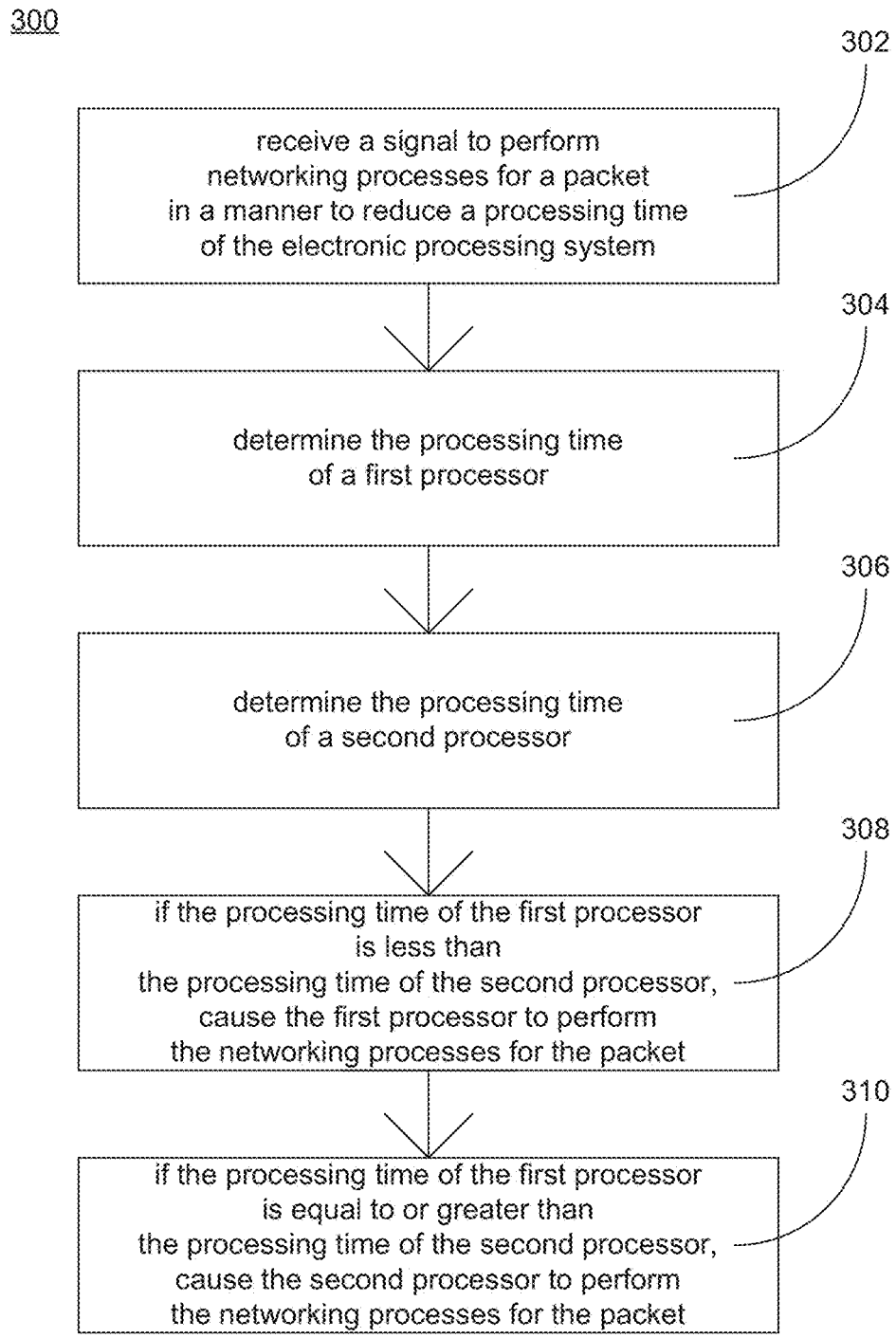

FIG. 3 is a process flowchart of an example method for processing a packet, according to an embodiment. A method 300 in FIG. 3 may be performed using an electronic processing system that operates hardware, software, firmware, or some combination of these.

In method 300, optionally, at 302, the electronic processing system may receive, from a user, a signal to perform networking processes for a packet in a manner to reduce a processing time of the electronic processing system.

At 304, the electronic processing system may determine the processing time of a first processor. The first processor may be a network interface controller or a central processing unit.

At 306, the electronic processing system may determine the processing time of a second processor. The second processor may be the network interface controller or the central processing unit. The second processor is different from the first processor.

At 308, if the processing time of the first processor is less than the processing time of the second processor, then the electronic processing system may cause the first processor to perform the networking processes for the packet. Optionally, the networking processes may include establishing a connection to a network.

Optionally, at 310, if the processing time of the first processor is equal to or greater than the processing time of the second processor, then the electronic processing system may cause the second processor to perform the networking processes for the packet. Optionally, the networking processes may include establishing the connection to the network.

Figure 4:
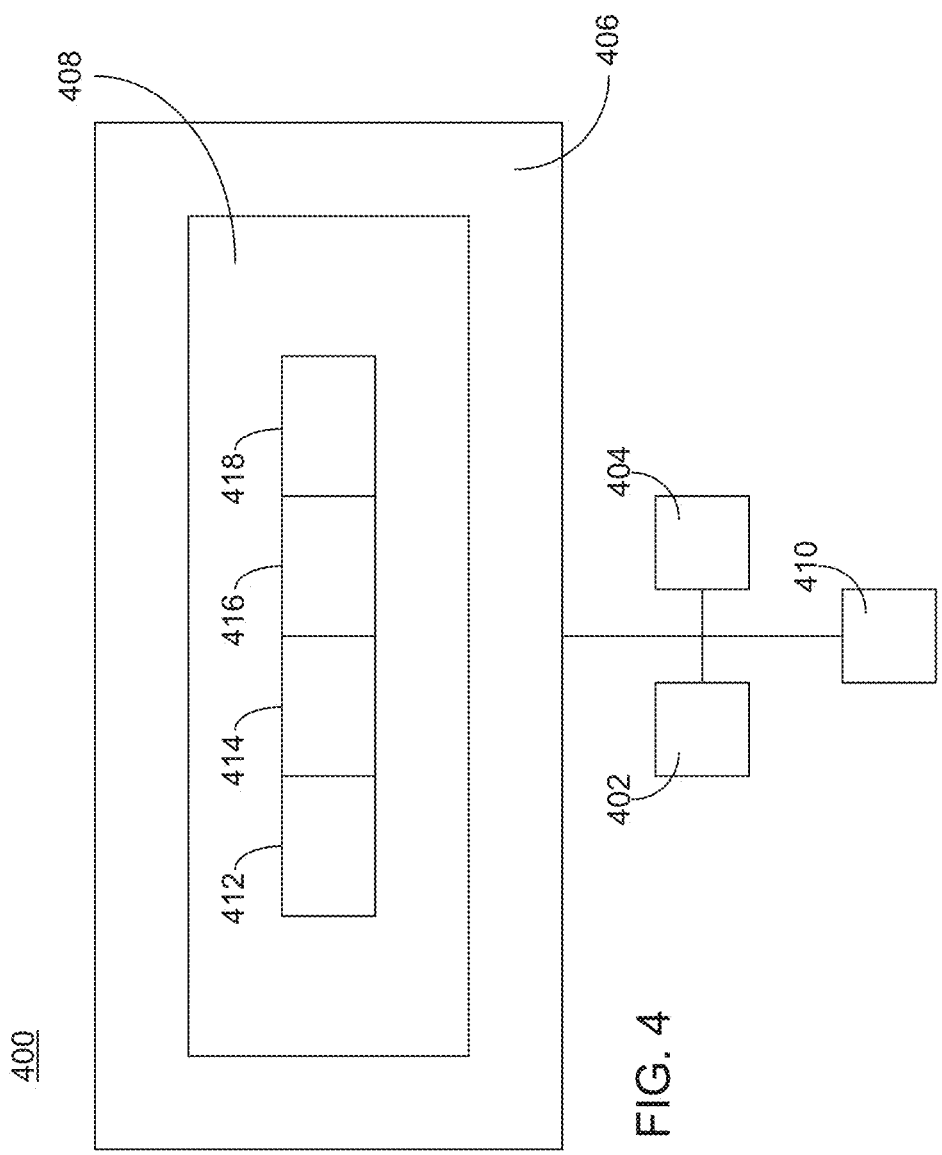

FIG. 4 is a block diagram of an example of a software or firmware embodiment of method 300, according to an embodiment. In FIG. 4, an electronic processing system 400 may include, for example, two or more programmable processors 402 and 404, a memory 406, a computer program logic 408, one or more I/O ports and/or I/O devices 410, first measurement logic 412, second measurement logic 414, and switching logic 416. Optionally, electronic processing system 400 may also include signal processing logic 418.

Two or more programmable processors 402 and 404 may be configured to execute the functionality of method 300 as described above. Two of more programmable processors 402 and 404 may include a network interface controller (NIC) and a central processing unit (CPU) and/or a graphics processing unit (GPU). Memory 406 may include one or more computer readable media that may store computer program logic 408. Memory 406 may be implemented as a hard disk drive, a removable media such as a compact disk, a read-only memory (ROM) or random access memory (RAM) device, for example, or some combination thereof. Two or more programmable processors 402 and 404 and memory 406 may be in communication using any of several technologies known to one of ordinary skill in the art, such as a bus. Computer program logic 408 contained in memory 406 may be read and executed by two or more programmable processors 402 and 404. The one or more I/O ports and/or I/O devices 410 may also be connected to two or more programmable processors 402 and 404 and memory 406.

In the embodiment of FIG. 4, computer program logic 408 may include first measurement logic 412, which may be configured to determine a processing time of a first processor. The first processor may be a network interface controller or a central processing unit.

Computer program logic 408 may also include second measurement logic 414, which may be configured to determine the processing time of a second processor. The second processor may be the network interface controller or the central processing unit. The second processor is different from the first processor.

Computer program logic 408 may also include switching logic 416, which may be configured to cause the first processor to perform networking processes for the packet if the processing time of the first processor is less than the processing time of the second processor. Optionally, the networking processes may include establishing a connection to a network. Optionally, switching logic 416 may also be configured to cause the second processor to perform the networking processes for the packet if the processing time of the first processor is equal to or greater than the processing time of the second processor. Optionally, the networking processes may include establishing the connection to the network.

Optionally, computer program logic 408 may also include signal processing logic 418, which may be configured to receive, from a user, a signal to perform the networking processes for the packet in a manner to reduce the processing time of electronic processing system 400.

Figure 5:
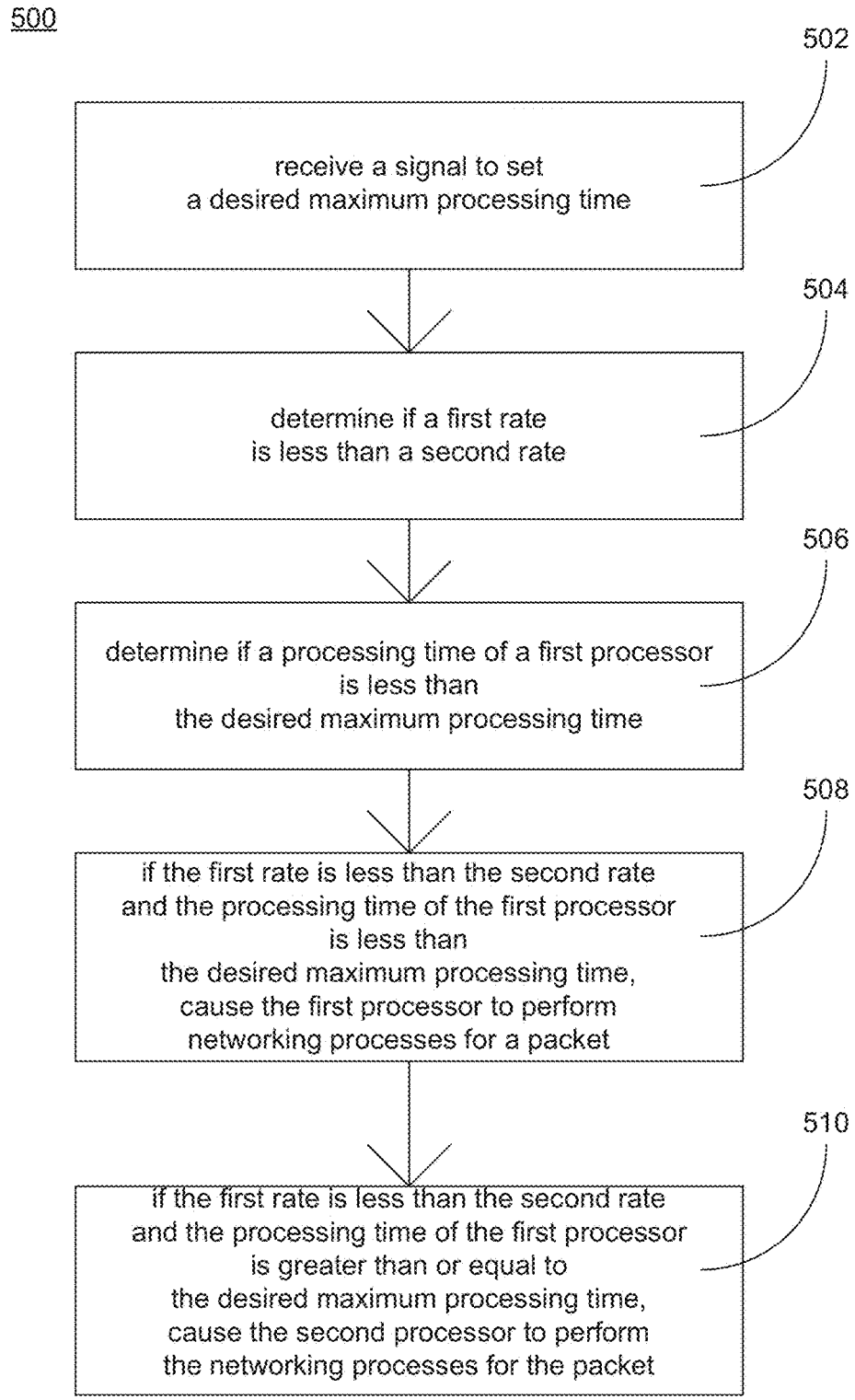

FIG. 5 is a process flowchart of an example method for processing a packet, according to an embodiment. A method 500 in FIG. 5 may be performed using an electronic processing system that operates hardware, software, firmware, or some combination of these.

In method 500, optionally, at 502, the electronic processing system may receive, from a user, a signal to set a desired maximum processing time.

At 504, the electronic processing system may determine if a first rate is less than a second rate. The first rate may be an amount of energy consumed by a first processor to process a unit of information in a packet. The second rate may be the amount of energy consumed by a second processor to process the unit of information in the packet. The first and second rates may be expressed, for example, in joules per byte. The first processor may be a network interface controller or a central processing unit. The second processor may be the network interface controller or the central processing unit. The second processor is different from the first processor.

At 506, the electronic processing system may determine if a processing time of the first processor is less than the desired maximum processing time.

At 508, if the first rate is less than the second rate and the processing time of the first processor is less than the desired maximum processing time, then the electronic processing system may cause the first processor to perform networking processes for the packet. Optionally, the networking processes may include establishing a connection to a network.

Optionally, at 510 if the first rate is less than the second rate and the processing time of the first processor is equal to or greater than the desired maximum processing time, then the electronic processing system may cause the second processor to perform the networking processes for the packet. Optionally, the networking processes may include establishing the connection to the network.

Figure 6:
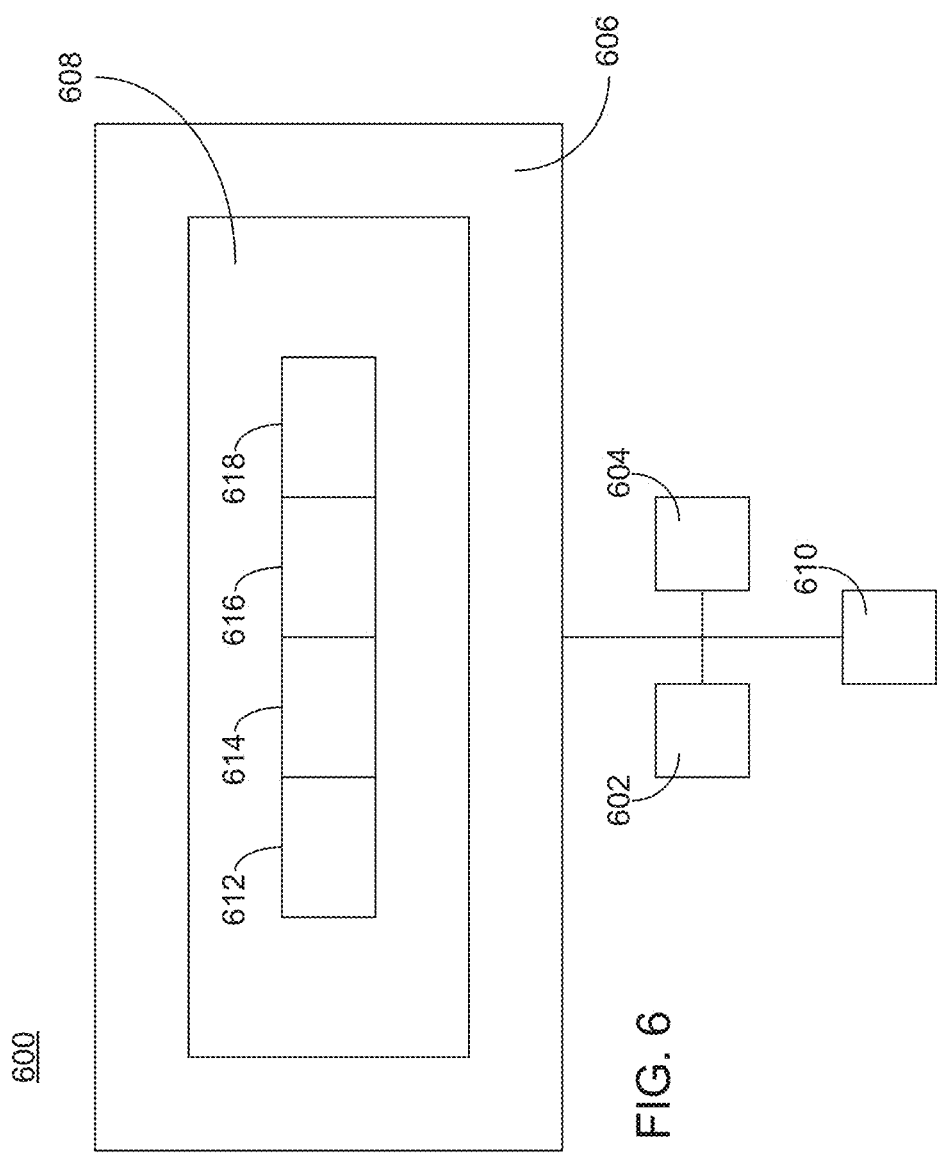

FIG. 6 is a block gram of an example of a software or firmware embodiment of method 500, according to an embodiment. In FIG. 6, an electronic processing system 600 may include, for example, two or more programmable processors 602 and 604, a memory 606, a computer program logic 608, one or more I/O ports and/or I/O devices 610, first comparison logic 612, second comparison logic 614, and switching logic 616. Optionally, electronic processing system 600 may also include signal processing logic 618.

Two or more programmable processors 602 and 604 may be configured to execute the functionality of method 500 as described above. Two or more programmable processors 602 and 604 may include a network interface controller (NIC) and a central processing unit (CPU) and/or a graphics processing unit (GPU). Memory 606 may include one or more computer readable media that may store computer program logic 608. Memory 606 may be implemented as a hard disk drive, a removable media such as a compact disk, a read-only memory (ROM) or random access memory (RAM) device, for example, or some combination thereof. Two or more programmable processors 602 and 604 and memory 606 may be in communication using any of several technologies known to one of ordinary skill in the art, such as a bus or interconnect. Computer program logic 608 contained in memory 606 may be read and executed by two or more programmable processors 602 and 604. The one or more I/O ports and/or I/O devices 610 may also be connected to two or more programmable processors 602 and 604 and memory 606.

In the embodiment of FIG. 6, computer program logic 608 may include first comparison logic 612, which may be configured to determine if a first rate is less than a second rate. The first rate may be an amount of energy consumed by a first processor to process a unit of information in a packet. The second rate may be the amount of energy consumed by a second processor to process the unit of information in the packet. The first and second rates may be expressed, for example, in joules per byte. The first processor may be a network interface controller or a central processing unit. The second processor may be the network interface controller or the central processing unit. The second processor is different from the first processor.

Computer program logic 608 may also include second comparison logic 614, which may be configured to determine if a processing time of the first processor is less than a desired maximum processing time.

Computer program logic 608 may also include switching logic 616, which may be configured to cause the first processor to perform networking processes for the packet if the first rate is less than the second rate and the processing time of the first processor is less than the desired maximum processing time. Optionally, the networking processes may include establishing a connection to a network. Optionally, switching logic 616 may also be configured to cause the second processor to perform the networking processes for the packet if the first rate is less than the second rate and the processing time of the first processor is equal to or greater than the desired maximum processing time. Optionally, the networking processes may include establishing the connection to the network.

Optionally, computer program logic 608 may also include signal processing logic 618, which may be configured to receive, from a user, a signal to set the desired maximum processing time.

Figure 7:
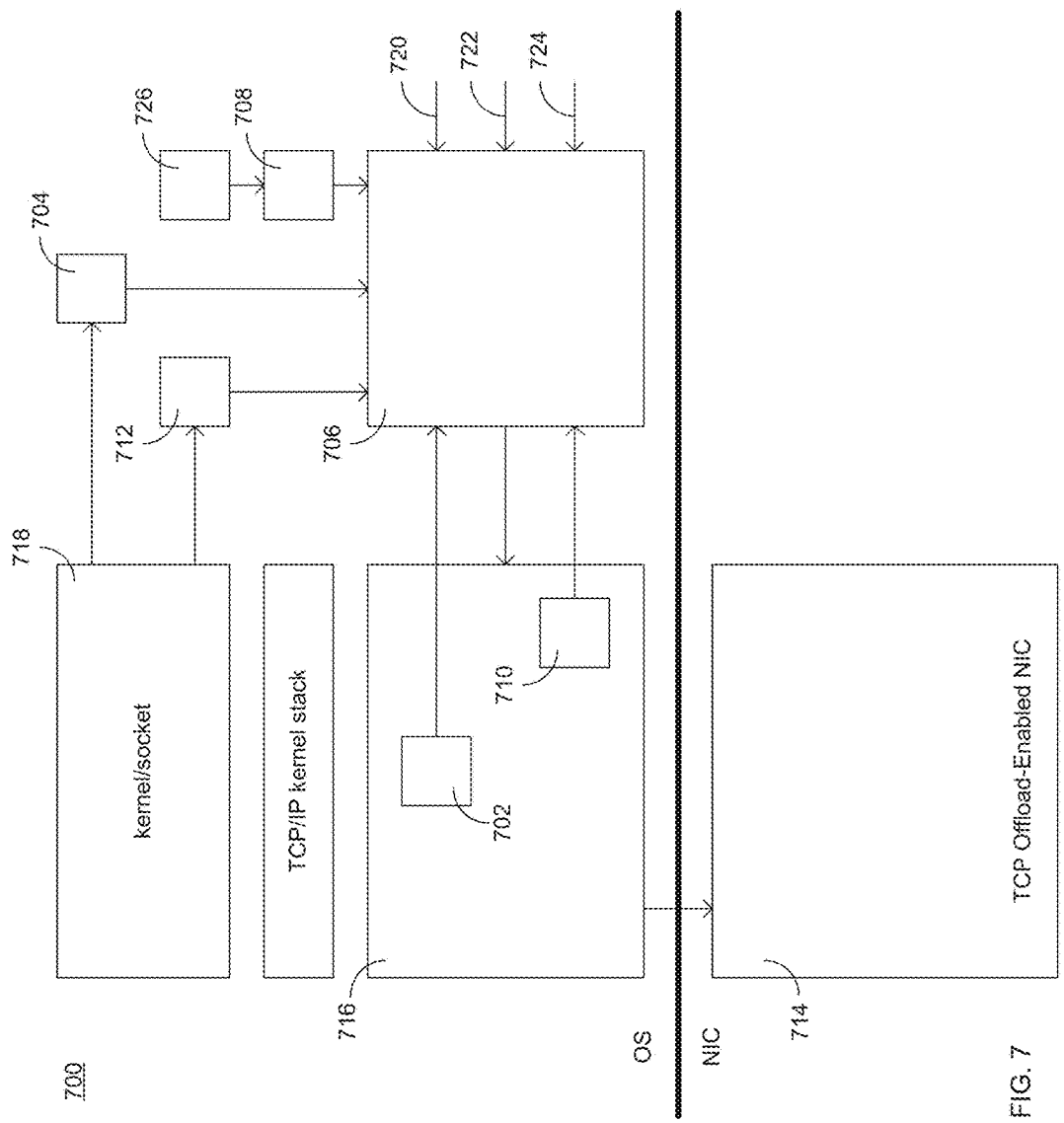
Figure 8:
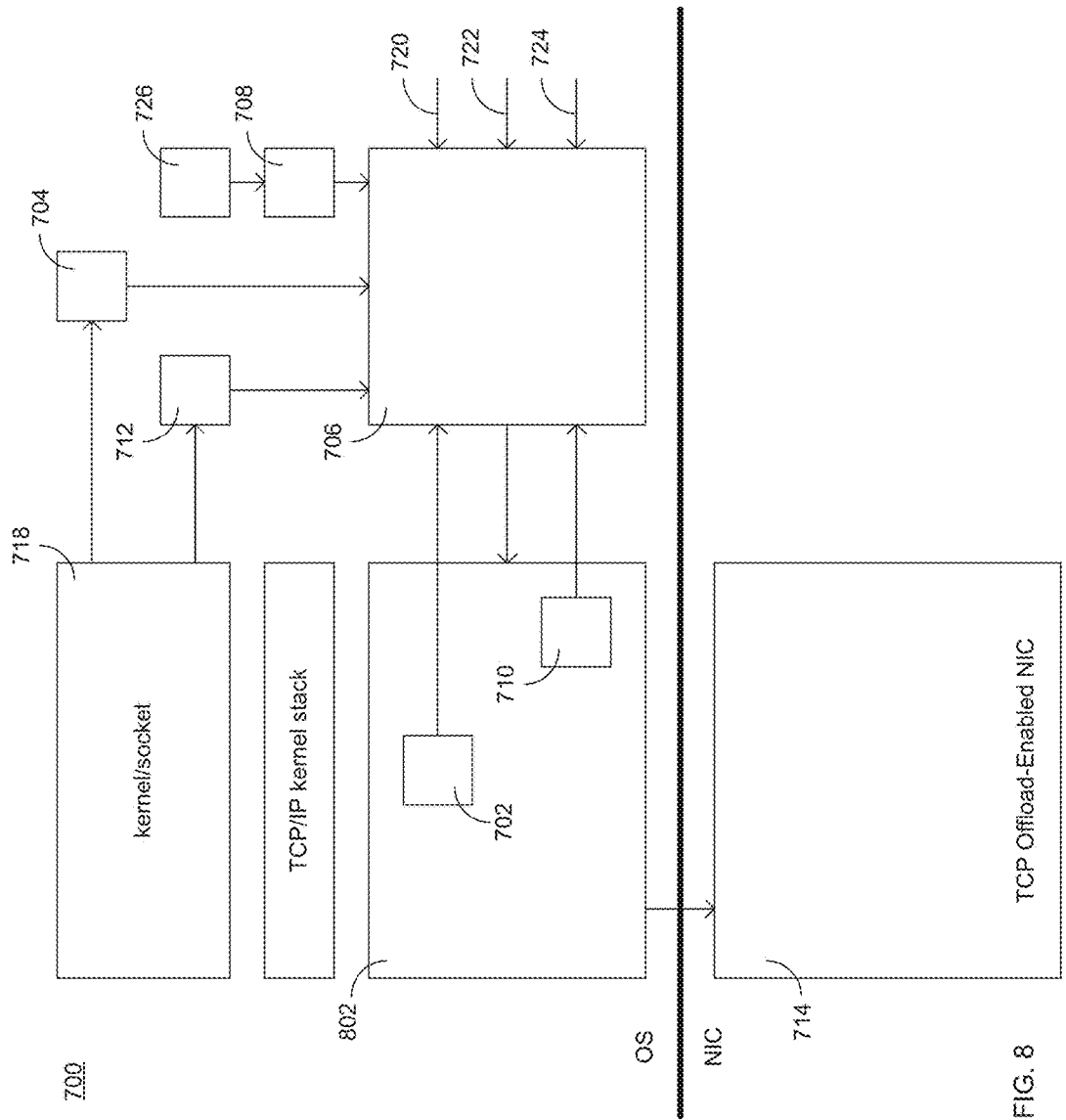
Figure 9:
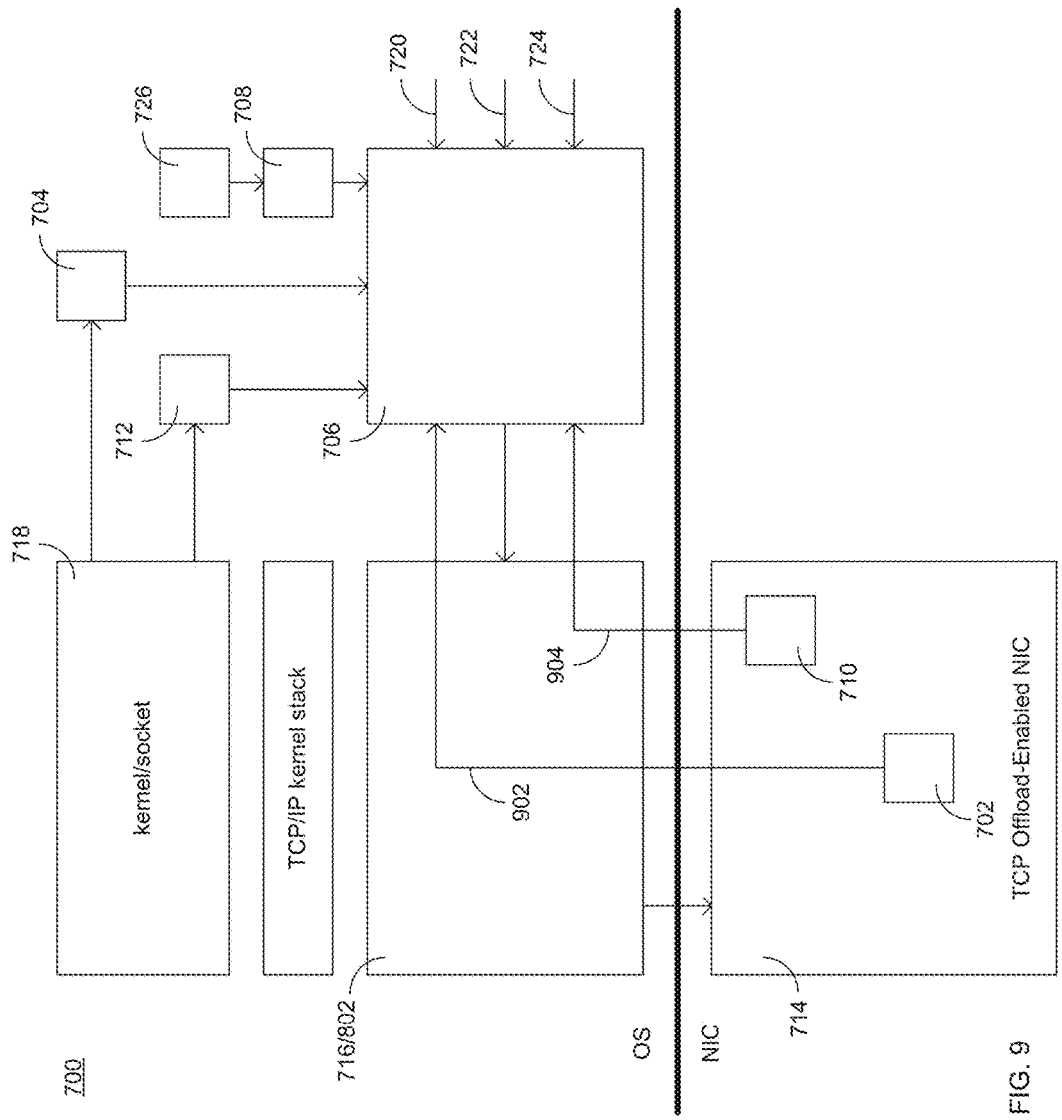

FIGS. 7, 8, and 9 are block diagrams of example systems for processing a packet, according to embodiments. In FIG. 7, a system 700 includes, for example, a first electronic system 702, a second electronic system 704, and a third electronic system 706. Optionally, system 700 may also include a fourth electronic system 708. Optionally, system 700 may also include a fifth electronic system 710 and a sixth electronic system 712.

First electronic system 702 may be configured to determine a first measurement and to transmit the first measurement. The first measurement is a measurement of a processing time of a network interface controller 714. Optionally, first electronic system 702 may use a timestamp technology to determine the measurement of the processing time. Using timestamp technology, the measurement of the processing time may be determined as the difference between the time at which network interface controller 714 finishes processing the packet and the time at which network interface controller 714 receives the packet. Alternatively, the measurement of the processing tie may be determined in another manner as will be apparent to a person skilled in the relevant art. Optionally, first electronic system 702 may be located in a network socket 716 configured to receive the packet. Alternatively, first electronic system 702 may be located in a network interface controller driver 802 as illustrated in FIG. 8. Alternatively, first electronic system 702 may be located in network interface controller 714 as illustrated in FIG. 9. Optionally, if first electronic system 702 is located in network interface controller 714, then system 700 may further comprise a communication path 902 between first electronic system 702 and third electronic system 706 that is through at least one of network socket 716 and network interface controller driver 802.

Second electronic system 704 may be configured to determine a second measurement and to transmit the second measurement. The second measurement is the measurement of the processing time of a central processing unit. Information about the central processing unit may be received, for example, via a kernel/socket 718. Optionally, second electronic system 704 may use a timestamp technology to determine the measurement of the processing time. Using timestamp technology, the measurement of the processing time may be determined as the difference between the time at which the central processing unit finishes processing the packet and the time at which the central processing unit receives the packet. Alternatively, the measurement of the processing time may be determined in another manner as will be apparent to a person skilled in the relevant art.

Third electronic system 706 may be configured to receive the first measurement and the second measurement and to select one of network interface controller 714 and the central processing unit to perform networking processes for the packet. Optionally, third electronic system 706 may be further configured to receive, from a user, a signal 720 to perform the network processes for the packet in a manner to reduce the processing time of system 700 for processing the packet. Optionally, third electronic processing system 706 may be further configured to receive, from a user, a signal 722 to set a desired maximum processing time.

Fourth electronic system 708 may be configured to transmit a first rate and a second rate. The first rate is an amount of energy consumed by network interface controller 714 to process a unit of information in the packet. The second rate is the amount of energy consumed by the central processing unit to process the unit of information in the packet. The first and second rates may be expressed, for example, in joules per byte. Third electronic system 706 may be further configured to receive the first rate and the second rate. Optionally, third electronic processing system 706 may be further configured to receive, from a user, a signal 724 to perform the networking processes for the packet in a manner to reduce the amount of energy consumed by system 700 for processing the packet. Optionally, the first rate, the second rate, or both may be known based upon the hardware specifications, firmware specifications, or both of network interface controller 714, the central processing unit, or both. If at least one of the first rate and the second rate has been predetermined, then system 700 may further comprise a memory 726 configured to store at least one predetermined value of at least one of the first rate and the second rate. Alternatively, fourth electronic system 708 may be further configured to determine at least one of the first rate and the second rate in another manner as will be apparent to a person skilled in the relevant art.

Fifth electronic system 710 may be configured to determine a third measurement and to transmit the third measurement. The third measurement is a measurement of a load of network interface controller 714. Third electronic system 706 may be further configured to receive the third measurement. Optionally, fifth electronic system 710 may use a counter to determine the measurement of the load. The counter may keep a count of the number of processes being performed by network interface controller 714. Generally, more connections to network interface controller 714 are indicative of a higher packet rate and longer processing times. Alternatively, the measurement of the load may be determined in another manner as will be apparent to a person skilled in the relevant art. Optionally, fifth electronic system 710 may be located in network socket 716. Alternatively, fifth electronic system 710 may be located in network interface controller driver 802 as illustrated in FIG. 8. Alternatively, fifth electronic system 710 may be located in network interface controller 714 as illustrated in FIG. 9. Optionally, if fifth electronic system 710 is located in network interface controller 714, then system 700 may further comprise a communication path 904 between fifth electronic system 710 and third electronic system 706 that is through at least one of network socket 716 and network interface controller driver 802.

Sixth electronic system 712 may be configured to determine a fourth measurement and to transmit the fourth measurement. The fourth measurement is the measurement of the load of the central processing unit. Information about the central processing unit may be received, for example, via kernel/socket 718. Third electronic system 706 may be further configured to receive the fourth measurement. Optionally, sixth electronic system 712 may use a counter to determine the measurement of the load. The counter may keep a count of the number of processes being performed by the central processing unit. Generally, more connections to the central processing unit are indicative of a higher packet rate and longer processing times. Alternatively, the measurement of the load may be determined in another manner as will be apparent to a person skilled in the relevant art.

Figure 10:
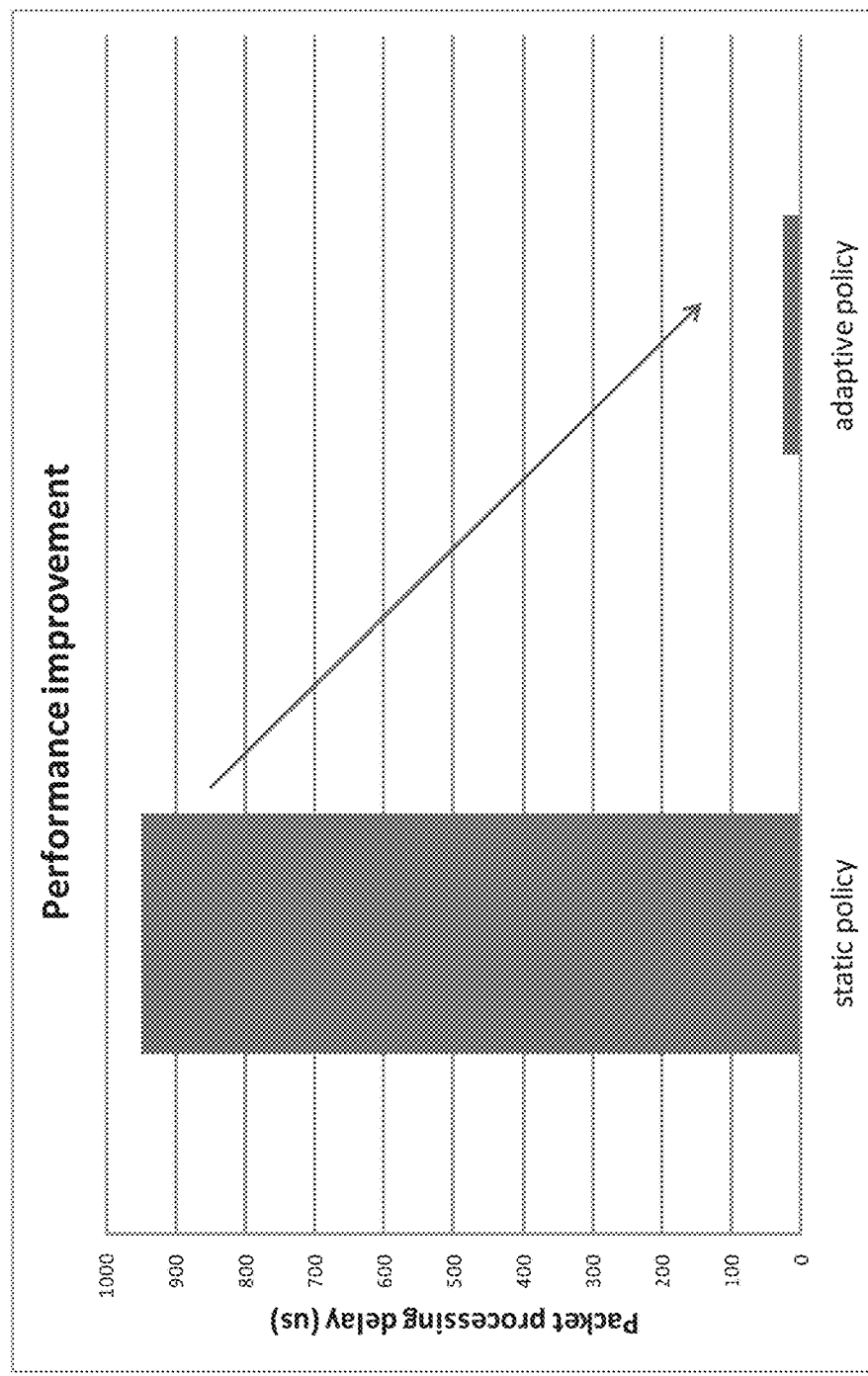
FIG. 10 is a bar chart that compares times for networking processes for a current implementation of an offload engine with an offload engine incorporating an embodiment described herein.

FIG. 10 is a bar chart that compares times for networking processes for a current implementation of an offload engine (static policy) with an offload engine incorporating an embodiment described herein (adaptive policy). The simulation that yielded the results illustrated in FIG. 10 assumed (static policy) an offload engine that automatically shifts networking processes from a central processing unit to a network interface controller so long as the load of the network interface controller is less than a full load. When a total of 2,048 connections were established the load of the network interface controller was substantially equal to the full load. The simulation demonstrated that under these conditions the network interface controller required almost one millisecond to complete networking processes for the packet. Such a long delay may substantially degrade overall performance.

In contrast, for the offload engine that incorporated an embodiment described herein (adaptive policy), which essentially considers quality of service information, about only 1,000 connections were shifted to the network interface controller. This reduced the processing time for the networking processes to about twenty microseconds. Additionally, having the network interface controller perform the networking processes associated with the about 1,000 connections substantially freed the central processing unit to perform other operations. The improvement in performance for this simulation, as measured by reduction in processing time, is about a factor of fifty. This factor may be even greater as new network interface controllers are developed to have capacities for a greater number of connections. Because in a heavily loaded data center server in which many virtual machines are operating simultaneously it is not uncommon for there to be 7,000 to 10,000 concurrent network connections, having offload engines that incorporated embodiments described herein may be important for managing processing times for networking processes.

Figure 11:
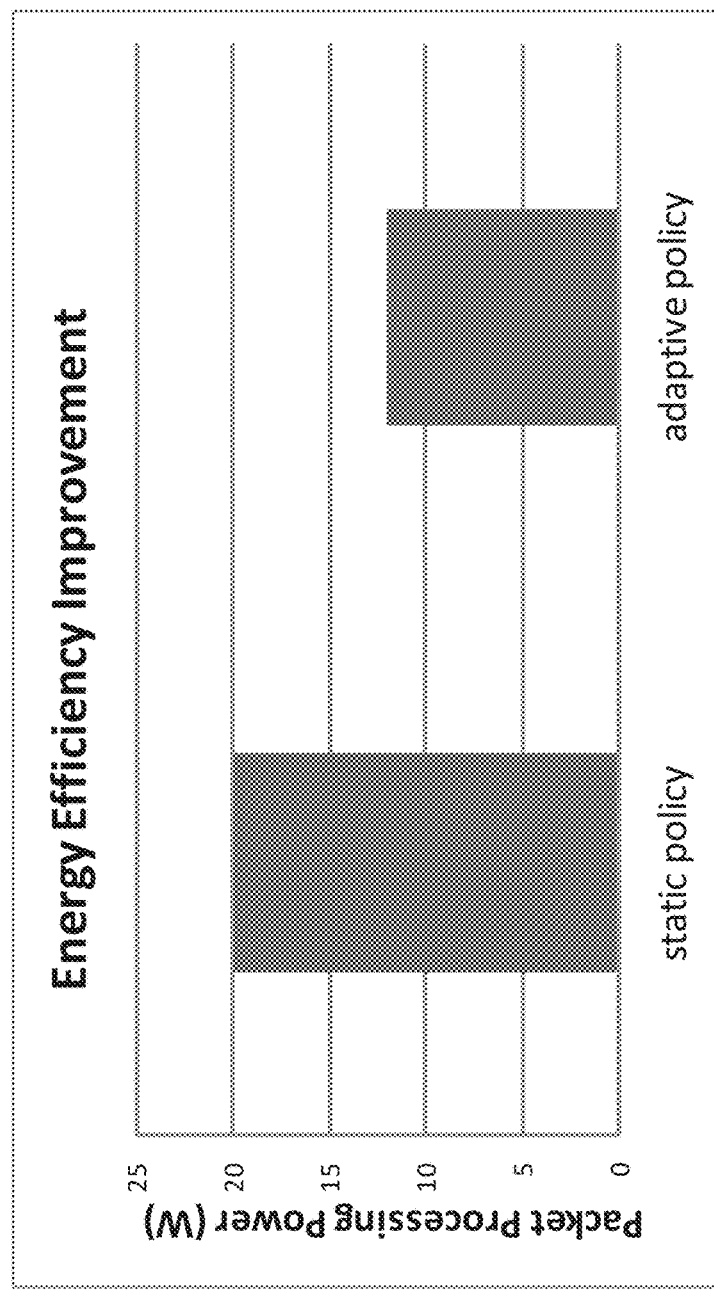
FIG. 11 is a bar chart that compares energy efficiency for networking processes for a current implementation of an offload engine with an offload engine incorporating an embodiment described herein.

FIG. 11 is a bar chart that compares energy efficiency for networking processes for a current implementation of an offload engine (static policy) with an offload engine incorporating an embodiment described herein (adaptive policy), The simulation that yielded the results illustrated in FIG. 11 assumed that the central processing unit had an energy efficiency of 0.1 joules per megabyte and the network interface controller had an energy efficiency of 0.2 joules per megabyte (i.e., the simulation assumed that the central processing unit was more energy efficient than the network interface controller). The simulation also assumed a throughput of 100 megabytes per second. For the offload engine that automatically shifts networking processes from a central processing unit to a network interface controller (static policy), the simulation determined total power consumption for networking processes to be about 20 watts. For the offload engine incorporating an embodiment described herein (adaptive policy), networking processes were performed mostly by the central processing unit even when the load of the network interface controller was sufficiently small enough that the network interface controller could have performed some of the networking processes.

The simulation assumed that the central processing unit could, in addition to its other operations, perform networking processes at an 80 megabyte per second throughput rate without increasing the processing time too much. To meet the overall throughput of 100 megabytes per second, the network interface controller was required to perform networking processes at only a 20 megabyte per second throughput rate. This reduced the power consumed for the networking processes to about 12 watts. The improvement in energy efficiency for this simulation was about 40 percent. This was accomplished while maintaining quality of service.

Methods 100, 300, and 500 and systems 200, 400, 600, and 700 may be implemented in hardware, software, firmware, or some combination of these including, for example, processors incorporating the Springville, Broadwell, or Skylake architectures being developed by Intel.

In embodiments, methods 100, 300, and 500 and systems 200, 400, 600, and 700 may be implemented as part of a wired communication system, a wireless communication system, or a combination of both. In embodiments, for example, methods 100, 300, and 500 and systems 200, 400, 600, and 700 may be implemented in a mobile computing device having wireless capabilities. A mobile computing device may refer to any device having an electronic processing system and a mobile power source or supply, such as one or more batteries, for example.

Examples of a mobile computing device may include a laptop computer, ultra-mobile personal computer, portable computer, handheld computer, notebook, tablet, palmtop computer, personal digital assistant (PDA), cellular telephone, combination cellular telephone/PDA, smart phone, pager, one-way pager, two-way pager, messaging device, data communication device, mobile Internet device, MP3 player, and so forth.

In embodiments, for example, a mobile computing device may be implemented as a smart phone capable of executing computer applications, as well as voice communications and/or data communications, Although some embodiments may be described with a mobile computing device implemented as a smart phone by way of example, it may be appreciated that other embodiments may be implemented using other wireless mobile computing devices as well. The embodiments are not limited in this context.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

One or more features disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, or a combination of integrated circuit packages. The term software, as used herein, refers to a computer program product including a computer readable medium having computer program logic stored therein to cause a computer system to perform one or more features and/or combinations of features disclosed herein. The computer readable medium may be transitory or non-transitory. An example of a transitory computer readable medium may be a digital signal transmitted over a radio frequency or over an electrical conductor, through a local or wide area network, or through a network such as the Internet. An example of a non-transitory computer readable medium may be a compact disk, a flash memory, or other data storage device.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the exemplary embodiments disclosed herein.

What is claimed is:

1. A method, comprising:
   receiving, from a network interface controller (NIC) of a computer system through a network socket, data indicative of packet processing times or packet processing energy consumption for the NIC;
   selecting one of a central processor of the computer system and the NIC of the computer system as a default processor to process a first network connection based on a comparison of one or more of the packet processing times and packet processing energy consumption of the central processor and the NIC, and selecting the other one of the central processor and the NIC as a secondary processor;
   causing the selected default processor to process the first network connection, including to establish the first network connection and to extract content from packets of the first network connection, if one of a load of the default processor is below a full load and a packet processing time of the default processor is below a predetermined maximum packet processing time, and otherwise causing the selected secondary processor to process the first network connection.

2. The method of claim 1, wherein:
   the selecting includes selecting one of the central processor and the NIC as a default processor to process the first network connection based on a comparison of packet processing energy consumption of the central processor and the NIC; and
   the causing includes causing the default processor to process the first network connection if the packet processing load of the default processor is below the full load.

3. The method of claim 2, further including:
   switching the default processor to the other one of the central processor and the NIC to process the first network connection if the packet processing time of the default processor is equal to or greater than a predetermined maximum packet processing time.

4. The method of claim 1, further including:
   causing the default processor to process a second network connection if the packet processing time of the default processor is below the predetermined maximum processing time at a start of the second connection.

5. The method of claim 1, wherein the selecting includes selecting the central processor as the default processor and selecting the NIC as the secondary processor, the method further including:
   reassigning unprocessed packets of the first network connection from the central processor to the NIC if the packet processing load of the NIC falls below the maximum packet processing load.

6. The method of claim 1, further including:
   selecting one of the central processor and the NIC as a default processor to process a second network connection based on a user-selectable preference regarding packet processing times and packet processing energy consumption.

7. A non-transitory computer-readable medium encoded with a computer program that includes instructions to cause an off-load engine to:
   receive, from a network interface controller (NIC) of a computer system through a network socket, data indicative of packet processing times or packet processing energy consumption for the NIC;

select one of a central processor of the computer system and the NIC of the computer system as a default processor to process a first network connection based on a comparison of one or more of the packet processing times and energy consumption of the central processor and the NIC, and select the other one of the central processor and the NIC as a secondary processor;

cause the selected default processor to process the first network connection, including to establish the first network connection and to extract content from packets of the first network connection, if one of a load of the default processor is below a predetermined maximum packet processing time, and otherwise cause the selected secondary processor to process the first network connection.

8. The non-transitory computer-readable medium of claim 7, further including instructions to cause the off-load engine to:

select one of the central processor and the NIC as the default processor to process the first network connection based on a comparison of packet processing energy consumption of the central processor and the NIC; and cause the default processor to process the first network connection if the packet processing load of the default processor is below the full load.

9. The non-transitory computer-readable medium of claim 8, further including instructions to cause the off-load engine to:

switch the default processor to the other one of the central processor and the NIC to process the first network connection if the packet processing time of the default processor is equal to or greater than a predetermined maximum packet processing time.

10. The non-transitory computer-readable medium of claim 7, further including instructions to cause the off-load engine to:

cause the default processor to process a second network connection if the packet processing time of the default processor is below the predetermined maximum packet processing time at a start of the second connection.

11. The non-transitory computer-readable medium of claim 7, further including instructions to cause the off-load engine to:

select the central processor as the default processor and select the NIC as the secondary processor; and re-assign unprocessed packets of the first network connection from the central processor to the NIC if the packet processing load of the NIC falls below the maximum packet processing load.

12. The non-transitory computer-readable medium of claim 7, further including instructions to cause the off-load engine to:

select one of the central processor and the NIC as a default processor to process a second network connection based on a user-selectable preference regarding packet processing times and packet processing energy consumption.

13. An apparatus, comprising an off-load engine configured to:

receive, from a network interface controller (NIC) of a computer system through a network socket, data indicative of packet processing times or packet processing energy consumption for the NIC;

select one of a central processor of the computer system and the NIC of the computer system as a default processor to process a first network connection based on a comparison of one or more of the packet processing times and energy consumption of the central processor and the NIC, and select the other one of the central processor and the NIC as a secondary processor; and cause the selected default processor to process the first network connection, including to establish the first network connection and to extract content from packets of the first network connection, if one of a load of the default processor is below a full load and a packet processing time of the default processor is below a predetermined maximum packet processing time, and otherwise cause the selected secondary processor to process the first network connection.

14. The apparatus of claim 13, wherein the off-load engine is further configured to:

select one of the central processor and the NIC as the default processor to process the first network connection based on a comparison of packet processing energy consumption of the central processor and the NIC; and cause the default processor to process the first network connection if the packet processing load of the default processor is below the full load.

15. The apparatus of claim 14, wherein the off-load engine is further configured to:

switch the default processor to the other one of the central processor and the NIC to process the first network connection if the packet processing time of the default processor is equal to or greater than a predetermined maximum packet processing time.

16. The apparatus of claim 13, wherein the off-load engine is further configured to:

cause the default processor to process a second network connection if the packet processing time of the default processor is below the predetermined maximum packet processing time at a start of the second connection.

17. The apparatus of claim 13, wherein the off-load engine is further configured to:

select the central processor as the default processor and select the NIC as the secondary processor; and re-assign the unprocessed packets of the first network connection from the central processor to the NIC if the packet processing load of the NIC falls below the maximum packet processing load.

18. The apparatus of claim 13, wherein off-load engine is further configured to:

select one of the central processor and the NIC as a default processor to process a first network connection based on a user-selectable preference regarding packet processing times and packet processing energy consumption.

* * * * *